United States Patent Office 2,716,527
Patented Aug. 30, 1955

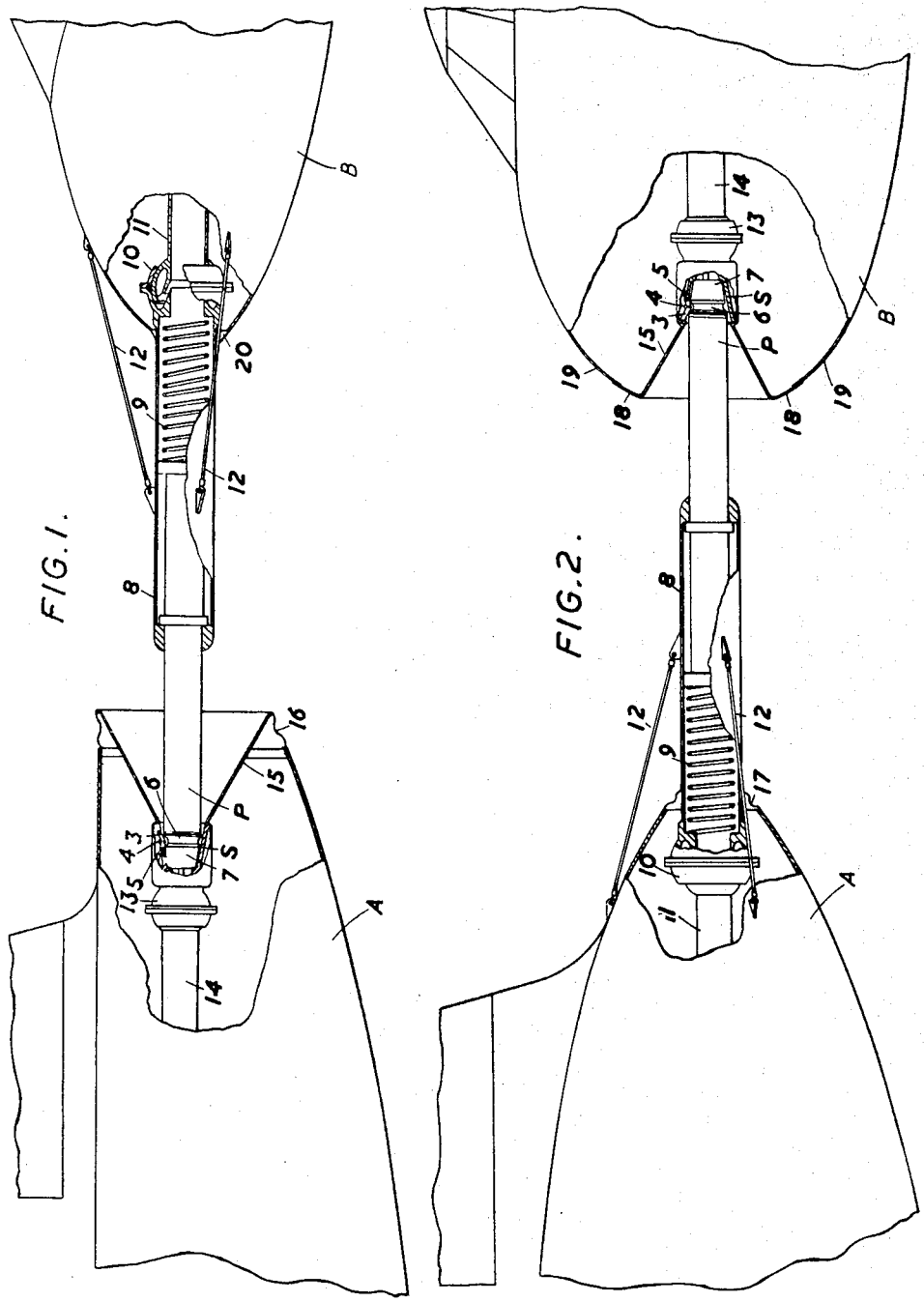

2,716,527

APPARATUS FOR AIRCRAFT-REFUELLING IN FLIGHT AND AIRCRAFT-TOWING

Cecil Hugh Latimer-Needham, Broadstone, England, assignor to Flight Refuelling Limited, London, England, a British company Application August 21, 1951, Serial No. 242,803

Claims priority, application Great Britain August 29, 1950

3 Claims. (Cl. 244—3)

This invention relates to an improvement or modification of the towing and/or flight-refuelling apparatus described in the specification of copending application for patent Serial No. 153,198 filed March 31, 1950, now U. S. Patent 2,692,102 of October 19, 1954.

The apparatus described in the above designated patent comprises essentially a trailing element extended rearwardly from the leading aircraft and a rigid element (called a "probe") extended forwardly from the following aircraft; and these elements terminate in the cooperating members of a self-engaging plug and socket coupling, of which the socket has spring-loaded latches, the plug member being in the form of a nozzle or spigot having an external circumferential groove engageable automatically by the latches of the socket when the nozzle or spigot is thrust into the socket. The trailing element is either flexible being in the form of a hose or hawser or is a jointed or universally mounted telescopic pipe or rod structure, of which the extremity can swing vertically and laterally; and it is preferably provided with a drogue at or near its extremity which causes the trailing element, or at least the terminal part thereof, to trail substantially horizontally.

The above mentioned patent also describes a modified form of probe structure in which the probe is mounted at its root on a universal joint and is spring-centred.

The present invention by combining some of these features in a different way provides a simplified structure.

According to this invention, one of the two aircraft, that is either the leader or the follower, has a nozzle- or spigot-receiving socket with spring-latches, of the kind described in Patent No. 2,692,102 recessed into a rearwardly or forwardly facing part of its structure, e. g. the extreme tail or extreme nose of the body, and the other aircraft carries a forwardly or rearwardly extending telescopic boom, with or without a fuel-conveying passage, which is universally-jointed at its root, with spring-centring means tending to hold it substantially in the line of flight, and which terminates in a grooved nozzle or spigot of the kind described in the above mentioned patent.

In this construction no drogue is employed, the boom being held horizontal by its centring spring means.

The telescopic boom may further include a buffer spring, which besides providing the resistance necessary to spring the latches of the socket into the groove of the nozzle or spigot when these coupling elements are thrust into mutual engagement enables the telescopic structure to contract resiliently under the engaging pressure or to accommodate the effect of gusts when the elements are coupled together.

The correct relative positioning of the socket and nozzle or spigot to enable contact and connection between the leading and following aircraft to be effected is entirely under the control of the pilot of the following aircraft which is steered to bring the coupling-elements into mutual engagement, in contradistinction to other known systems employing a boom trailed by the leading aircraft in which the boom is maneuvered by an operator in the leading aircraft to bring its extremity into line with a coupling device mounted in the following aircraft.

Further, the horizontal disposition of the boom, whether trailing or forwardly extending, minimises the risk of accident due to vertical relative movement of the two aircraft in gusty conditions, which constitutes a serious hazard in systems employing a downwardly inclined trailing boom.

The accompanying drawings illustrate, by way of example, two specific embodiments of the invention. In the drawings, Figure 1 is a side elevation, partly sectioned, of one embodiment; and Figure 2 is a similar view of the second embodiment.

In both figures, the tail of the leading aircraft is indicated by A and the nose of the following aircraft by B; S is the socket and P the hollow plug member of the coupling.

The socket carries pivoted latches 3 carrying rollers 4 and loaded by spring-plungers 5. The plug member P has an external circumferential groove 6 engageable by the latch rollers 4 and terminates in a tapered nozzle 7 which seats on the throat of the socket when the rollers 4 enter groove 6.

The plug member P forms the movable member of a telescopic structure comprising an outer tube 8 and a spring 9 tending to extend the plug member. The tube 8 is connected by a ball and socket joint 10 to a fixed fuel pipe 11 and centred by means of tension springs or rubber cords 12. The socket S is similarly connected to a fixed fuel pipe 14 by a ball and socket joint 13 of similar construction to joint 10.

In Figure 1 the socket S is recessed into the tail of aircraft A and the plug member P mounted in the nose of aircraft B, while in Figure 2 the opposite arrangement is shown. The socket is extended by means of a conical funnel 15 and the gap between the rim of this funnel and the edge of the opening in the aircraft's skin is sealed in Figure 1 by a flexible membrane 16 and in Figure 2 by a spherically shaped annular shield 18, which slides over the adjacent skin portion 19 when the socket moves on its ball-joint 13. In Figure 2 the gap between the tube 8 and the edge of the opening in the aircraft's skin is sealed by a flexible membrane 17, and in Figure 1 by a flexible but relatively robust gaiter 20.

As the following aircraft B closes on the leader A from astern, the plug member P being fully extended by spring 9, the funnel 15 guides the plug member into the socket S until the taper 7 passes the latches 3, 4, 5 which spring into the groove 6 and lock the plug member in the socket. The shock of engagement is cushioned by the spring 9, which can be allowed to re-extend the plug member P after the coupling of the aircraft has been effected by allowing the aircraft B to fall astern slightly.

Release of the coupling is obtained by allowing aircraft B to fall astern so as to apply sufficient tension to the coupling to spring the latches 3, 4, 5 out of the groove 6.

By forming the telescopic structure 8, P as a hydraulic or pneumatic jack, it is possible, if desired, to retract the plug member P when not in use until spring 9 is fully compressed.

Means for controllably locking the latches 3, 4, 5 in engagement with groove 6 may be provided as described in the above referred to U. S. Patent No. 2,692,102.

I claim:

1. Apparatus for coupling and uncoupling two aircraft in flight, for example, for flight refueling or/and towage purposes by means of a self-engaging plug and socket coupling; said apparatus comprising a funnel-like coupling socket member recessed into an opening in the structure of one of the aircraft to be coupled together, means supporting said socket member within said structure with the axis of the socket member substantially parallel to the line of flight but susceptible of slight universal pivotal movement about an inwardly disposed portion of said socket member; means retaining said socket member against projection thereof substantially beyond the boundary surface of said aircraft structure, sealing means between the margins of the mouth of said socket member and the adjacent margins of the opening in the aircraft structure, said sealing means being adaptable and conformable to the limited universal pivotal movement of the socket member to maintain the seal during such movement, spring loaded latch members mounted on said socket, an extending telescopic boom mounted on the other of said aircraft, boom mounting means including a universal joint and spring centering means tending to hold the boom substantially parallel to the line of flight, and a coupling plug mounted on the extremity of said boom and having a circumferential groove engageable by said spring loaded latch members on said socket member upon bringing the plug and socket member into cooperative relationship.

2. Apparatus as set forth in claim 1 in which the boom, plug and socket member are provided with passages which, when the plug is engaged in the socket member, constitute a continuous fuel conveying passage.

3. In an apparatus for coupling and uncoupling two aircraft in flight, for example, for flight refuelling or/and towage purposes by means of a self-engaging plug and socket coupling; the sub-combination which comprises a funnel-like coupling socket member recessed into an opening in the structure of one of the aircraft to be coupled together, means supporting said socket member within said structure with the axis of the socket member substantially parallel to the line of flight but susceptible of slight universal pivotal movement about an inwardly disposed portion of said socket member; means retaining said socket member against projection thereof substantially beyond the boundary surface of said aircraft structure, sealing means between the margins of the mouth of said socket member and the adjacent margins of the opening in the aircraft structure, said sealing means being adaptable and conformable to the limited universal pivotal movement of the socket member to maintain the seal during such movement, a latching device carried by the socket for automatically receiving and retaining a plug member carried upon the other of said aircraft.

References Cited in the file of this patent

UNITED STATES PATENTS

| | | |
|---|---|---|
| 1,328,373 | Garzoni | Jan. 20, 1920 |
| 1,728,449 | Procofieff-Seversky | Sept. 17, 1929 |
| 1,848,372 | Moran | Mar. 8, 1932 |
| 2,142,411 | Ramsay | Jan. 3, 1939 |
| 2,199,588 | Cobham et al. | May 7, 1940 |
| 2,385,392 | Van Dusen | Sept. 25, 1945 |
| 2,596,455 | Williams | May 13, 1952 |

OTHER REFERENCES

"Aviation Week," pages 18–20, August 29, 1949.